United States Patent [19]
Hoop

[11] 3,782,177
[45] Jan. 1, 1974

[54] METHOD AND APPARATUS FOR NON-DESTRUCTIVE TESTING

[75] Inventor: James M. Hoop, Hazel Green, Ala.

[73] Assignee: The United States of America as represented by the Administrator of the National Aeronautics and Space Adminstration, Washington, D.C.

[22] Filed: Apr. 20, 1972

[21] Appl. No.: 246,056

[52] U.S. Cl. ............ 73/71.5 U, 73/67.5 R, 324/40
[51] Int. Cl. ........................................... G01n 29/04
[58] Field of Search ..................... 73/67.5 R, 67.6, 73/67.7, 67.8 R, 67.8 S, 67.9, 71.5 U; 340/12 SD; 179/113

[56] References Cited
UNITED STATES PATENTS

| | | | |
|---|---|---|---|
| 2,946,217 | 7/1960 | Fruengel | 73/67.5 R |
| 3,688,562 | 9/1972 | Munger et al. | 73/67.7 |
| 2,240,941 | 5/1941 | Ohl | 340/12 SD UX |
| 3,512,400 | 5/1970 | Lynnworth | 73/67.5 R |
| 3,282,087 | 11/1966 | Dickenson | 73/71.5 U |
| 2,559,227 | 7/1951 | Rieber | 340/12 SD UX |
| 3,057,188 | 10/1962 | Henry | 73/67.1 |

Primary Examiner—Richard C. Queisser
Assistant Examiner—John P. Beauchamp
Attorney—L. D. Wofford, Jr. et al.

[57] ABSTRACT

A high voltage is applied to an arc gap adjacent to a test specimen to develop a succession of high-frequency arc discharges. Those high frequency arc discharges generate pulses of ultrasonic energy within the test specimen without requiring the arc discharges to contact that test specimen and without requiring a coupling medium between those arc discharges and that test specimen. Those pulses can be used for detection of flaws, for measurement of certain properties of the test specimen, and for measurement of stresses within that test specimen.

2 Claims, 5 Drawing Figures

PATENTED JAN 1 1974 3,782,177
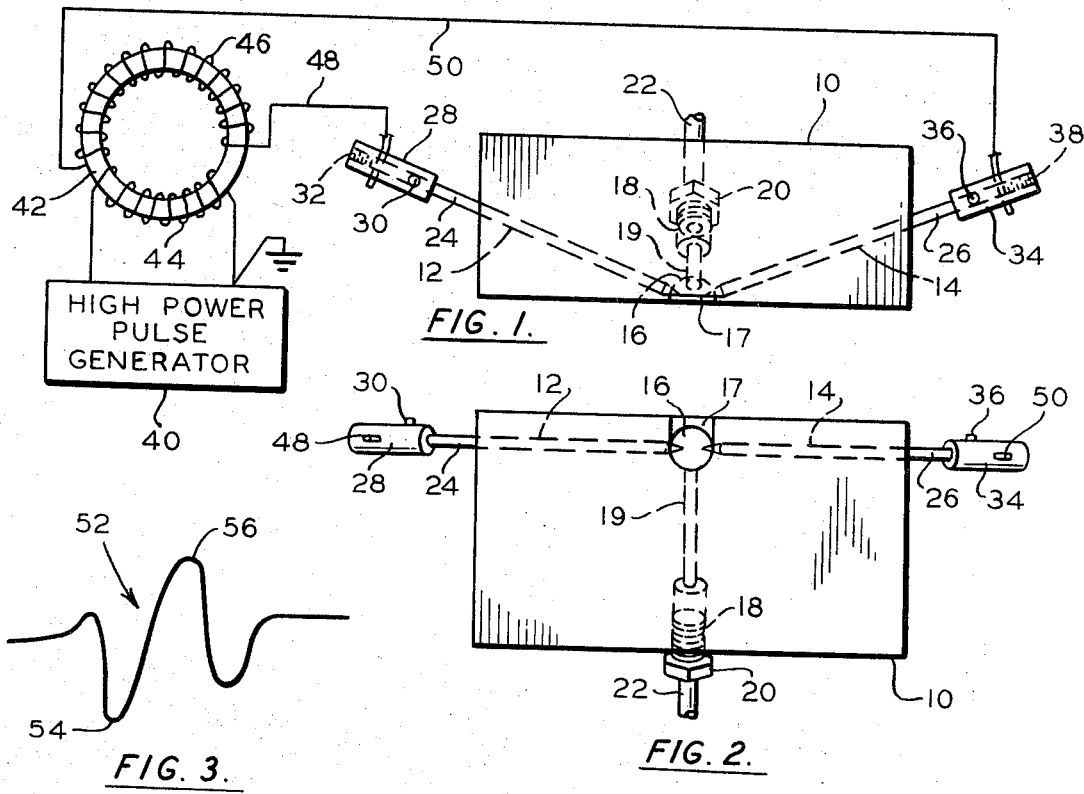
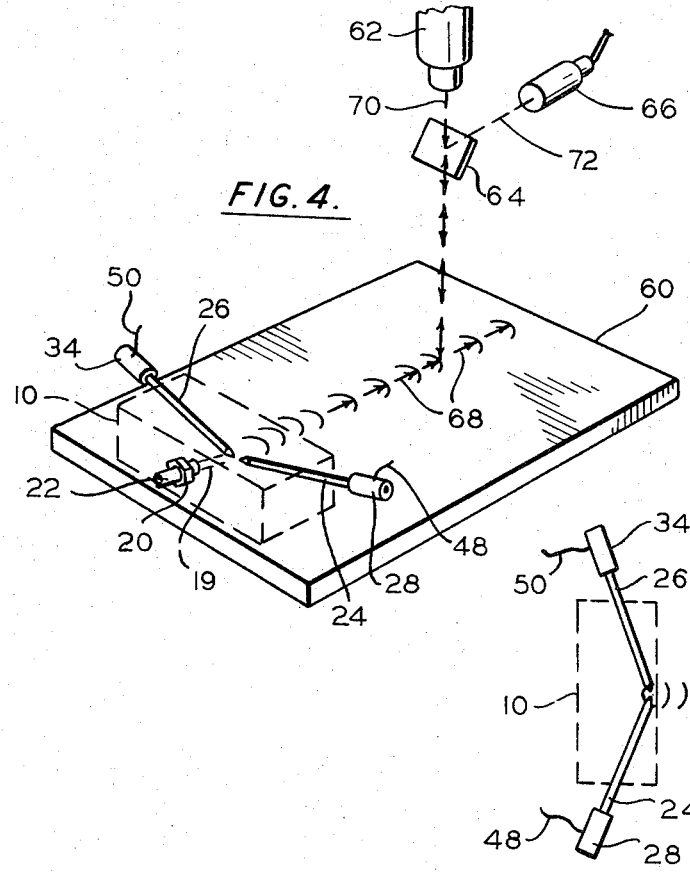

METHOD AND APPARATUS FOR NON-DESTRUCTIVE TESTING

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

This invention relates to a transducer which develops ultrasonic pulses within a test specimen without adversely affecting that test specimen. The development of such pulses is desirable because it facilitates the detection of flaws in the test specimen, makes it possible to test for certain properties of the material in the test specimen, and makes it possible to test for the presence of stresses which are applied to the test specimen or which are incorporated within the test specimen.

2. Description of the Prior Art

Electromagnets have been used to develop mechanical vibrations within test specimens of magnetic material; and crystal-type transducers have been used to apply ultrasonic vibrations to test specimens. The use of electromagnets is inherently limited to the testing of materials which are magnetic in nature, and also is limited to testing at relatively low frequencies. Where crystal-type transducers are used in the testing of materials, the vibrations developed by those transducers are usually transmitted to the test specimens through a liquid or a paste which is used as a coupling medium; and the use of a coupling medium is impractical with many coated or porous materials which should be tested. In addition, the use of a coupling medium is usually limited to test specimens which have fairly smooth surfaces. Furthermore, crystal-type transducers characteristically develop beams of large cross section; and, frequently, small cross-section beams are needed for testing small and intricate test specimens and for precise testing of small areas of large test specimens. Moreover, the liquid or paste which is used as a coupling medium can lead to signal drift, and thus can lead to inaccurate test results. Some crystal-type transducers are mechanically held in intimate engagement with test specimens; but the stresses which can be developed by the forces needed to hold such transducers in such engagement can lead to inaccurate test results. Also such transducers can not be held in intimate engagement with test specimens that are small or intricate. Further, it is not always possible to provide the access to both sides of a test specimen which mechanical holding methods usually require. Laser beams can be used to develop ultrasonic waves within test specimens; but the resulting waves have low pulse rates, and the use of a laser frequently is hazardous and necessitates the use of bulky equipment.

SUMMARY OF THE INVENTION

The present invention develops high-frequency arc discharges adjacent a test specimen, and thereby develops highly-localized, ultrasonic frequency waves within that test specimen in a non-destructive manner. The beam of ultrasonic waves developed by the arc discharge has a small cross section, and thus can provide testing of small and intricate test specimens, and also can provide precise testing of any given area on a large test specimen. The beam does not require any coupling medium and can, therefore, be used with test specimens with which coupling media can not or should not be used. Further, the fact that a coupling medium is not needed makes it possible to avoid the signal drift that can occur when such a medium is used. The beam of ultrasonic waves can pass through the air in passing to the test specimen; and hence it is not necessary to hold the source of the arc discharges in engagement with a test specimen — thereby enabling that beam to be used in testing small, intricate and irregularly shaped test specimens. The arc discharges can be developed inexpensively and without hazard to life or property. Moreover, the ultrasonic waves can have a relatively high frequency; and hence the present invention obviates the objections which are inherent in the use of prior art non-destructive tests. It is, therefore, an object of the present invention to provide high-frequency arc discharges adjacent a test specimen to develop ultrasonic waves within that test specimen.

In the drawing,

FIG. 1 is an elevational view of one preferred embodiment of transducer that is made in accordance with the principles and teachings of the present invention, and it schematically shows a High Power Pulse Generator and a transformer which supply high-voltage pulses to that transducer, FIG. 2 is a view of the bottom of the transducer shown in FIG. 1, FIG. 3 shows a typical wave form which is applied to the primary winding of the transformer of FIG. 1, and which is developed across the secondary winding of that transformer, FIG. 4 is a perspective view of the transducer of FIG. 1 as it appears when mounted close to a test specimen, and of a detector which is spaced above the level of that test specimen, and FIG. 5 is a diagrammatic showing of the transducer of FIG. 1, of a detector, and of a test specimen positioned therebetween.

DESCRIPTION OF THE PREFERRED EMBODIMENT

Referring to the drawing in detail, the numeral 10 denotes a support which is made of a dielectric material; and that support is shown as being rectangular in plan and in elevation. In the said preferred embodiment of the present invention, that support is made of a colorless acrylic plastic so it is transparent. An elongated recess 12 inclines downwardly and inwardly from the lefthand wall of that support to a small generally hemispherical chamber 16 in the bottom surface of that support. As indicated by FIGS. 1 and 2, that chamber opens to the bottom surface of that support. The numeral 14 denotes a similar elongated recess which inclines downwardly and inwardly from the right-hand wall of the support 10 to the chamber 16. As shown by FIGS. 1 and 2, the inner ends of the recesses 12 and 14 are disposed at opposite sides of the chamber 16; and those ends are frusto-conical in configuration. However, if desired, the recesses 12 and 14 could be made of constant cross-section throughout their lengths. A shallow passage 17, which is rectangular in plan and in elevation, is formed in the lower surface of the support 10; and that passage extends from the chamber 16 to the front edge of that support.

The numeral 18 denotes a threaded socket in the rear wall of the support 10; and the axis of that socket inclines downwardly and forwardly from that rear wall toward the chamber 16. A passage 19 extends from the forward end of the threaded socket 18 to the rear end of the chamber 19, as indicated paricularly by FIG. 2. The internally threaded socket 18 accommodates an externally threaded fitting 20 which is mounted on the inner end of a tube 22. The outer end of that tube will be suitably connected to a source of compressed gas, such as air.

The numeral 24 denotes an elongated cylindrical rod which has a conical tip; and that rod is telescoped within the recess 12 in the support 10. Where that recess has a frusto-conical lower end, as shown by FIGS. 1 and 2, the conical tip of the rod 24 will have the larger-diameter portion thereof abutting that frusto-conical end, and will have the tip thereof projecting into the chamber 16. The numeral 26 denotes a similar elongated rod which is telescoped within the recess 14. Where that recess has a frusto-conical lower end, as shown by FIG. 1, the conical tip of the rod 26 will have the larger-diameter portion thereof abutting that frusto-conical end, and will have the tip thereof projecting into the chamber 16.

The engagements between the conical tips of the elongated rods 24 and 26 with the frusto-conical lower ends of the recesses 12 and 14, respectively, will provide an automatic and precisely fixed spacing between the tips of those rods. If the recesses 12 and 14 were to be made with constant cross-sections throughout their lengths, the positions of the rods 24 and 26 would have to be adjusted to provide the desired spacing between the tips of these rods. By making the inner diameters of the recesses 12 and 14 just slightly greater than the diameter of the rods 24 and 26, frictional forces are developed which can hold those rods at any desired positions relative to those recesses. The rods 24 and 26 can be made of various materials; but they will preferably be made from a material, such as tungsten, which is resistant to erosion when used as a spark gap.

The numeral 28 denotes a sleeve-type connector which is telescoped over the outer end of the rod 24; and a set screw 30 fixedly secures that sleeve-type connector to that rod. A passage extends transversely through the sleeve-type connector 28, and a set screw 32 is threadably mounted in the outer end of that sleeve-type connector. The numeral 34 denotes a sleeve-type connector which can be identical to the sleeve-type connector 28. A set screw 36 fixedly secures that sleeve-type connector to the rod 26. A passage extends through the sleeve-type connector 34, and a set screw 38 is threadably mounted in the outer end of that sleeve-type connector.

The numeral 40 in FIG. 1 denotes a High Power Pulse Generator of standard and usual design. Although various High Power Pulse Generators could be used, one High Power Pulse Generator which has been found to be desirable is a Velonex Model 350 High Power Pulse Generator. One of the output terminals of that High Power Pulse Generator is connected to ground, and also to one terminal of the primary winding 44 of a powdered core transformer. The other terminal of that primary winding is connected to the other output terminal of that High Powder Pulse Generator. In the said one preferred embodiment of the present invention, the powdered core 42 of the transformer is toroidal in configuration. The numeral 46 denotes the secondary winding of the powdered core transformer; and one terminal of that secondary winding is connected to the sleeve-type connector 28, and thus to the rod 24, by a conductor 48 which extends through the transversely-extending passage in that sleeve-type connector and which is held by the set screw 32. The other terminal of the secondary winding 46 is connected to the sleeve-type connector 34, and thus to the rod 26, by a conductor 50 which extends through the transversely extending passage in that sleeve-type connector and which is held by the set screw 38.

In the said one preferred embodiment of the present invention, the High Power Pulse Generator 40 applies a wave form 52, shown in FIG. 3, to the primary winding 44 of the powdered core transformer. That wave form has a negative-going peak 54 and a positive-going peak 56 which constitute the significant portions of that wave form. A small positive-going portion of the wave form 52 precedes th negative-going peak 54, and a negative-going portion succeeds the positive-going peak 56; but that positive-going portion and that negative-going portion are not significant to the operation of the present invention. In the said preferred embodiment of the present invention, the powdered core 42 of the transformer has an inner diameter of about 1⅞ inches, the primary winding 44 has seven turns, and the secondary winding 46 has 32 turns. The radius of the hemispherical chamber 16 is ⅛ of an inch, the passage 17 is 20 thousandths of an inch deep, the diameter of each elongated rod is ⅛ of an inch, and the distance between the tips of those elongated rods is about 50 thousandths of an inch. The High Power Pulse Generator 40 applies pulses to the primary winding 44 which have peak-to-peak values of at least 2,000 volts; and hence the secondary winding 46 applies pulses to the rods 24 and 26 which have peak-to-peak values of at least 10,000 volts. The application of the resulting high voltage pulses to the rods 24 and 26 causes a succession of high frequency arc discharges to occur between the tips of those rods.

The particular number of turns on the powdered core 42 of the transformer is not critical, and use of a toroidal core is not critical. However, a core must be selected which will not dampen the frequency of the spark discharges; and the ratio of the turns in the primary and secondary windings should be such as to limit the voltage, which must be applied to the primary winding 44, to an acceptable level.

In the said preferred embodiment of the present invention, the rods 24 and 26 have sharp conical tips; and those tips project into the chamber 16. The recesses 12 and 14 coact with the lower surface of the support 10 to subtend angles of 20°. The sleeve-type connectors are made of brass; and they provide low-resistance connections to the elongated rods 24 and 26. The High Power Pulse Generator 40 supplies 80 nanosecond pulses to the primary winding 44, and the secondary winding 46 supplies higher-voltage pulses of the same duration to the rods 24 and 26 via conductors 48 and 50 and sleeve-type connectors 28 and 34. The tube 22 is connected to a source of compressed air; and a small quantity of air will pass successively through the passage 19 and the chamber 16 and then outwardly through the passage 17 during the operation of the transducer. That air will provide constant purging of the atmosphere within the chamber 16.

The angles of the rods 24 and 26 with respect to the lower surface of the support 10, and thus relative to the surface of any test specimen adjacent which the support 10 is disposed, are not critical. However, those or similar angles are desirable because they dispose the tips of the rods 24 and 26 close to each other and close to the lower surface of the support 10. Although the rods 24 and 26 are shown aligned with each other in FIG. 2, they need not be aligned with each other. The alignment of those rods, and their inclinations at acute angles relative to the lower surface of the support 10, merely constitute convenient ways of locating the arc discharges close to the lower surface of the support 10, and thus close to the surface of a test specimen near which the support 10 is disposed. The rods 24 and 26 could be disposed in different orientations relative to each other, but they should be so disposed that the arcing which occurs between them is restricted to the conical tips thereof. The length of the gap, across which the arc discharges must develop, must be short enough to assure the development of an arc there-across during each pulse which the secondary winding 46 will apply to the rods 24 and 26; but if that gap is too short, the amount of ultrasonic energy which is developed by each pulse will be reduced. Consequently, although the fifty thousandth of an inch length for the arc gap is not critical, it is a very useful arc gap length. The continual flow of air through the passage 19 and through the chamber 16 is desirable because it removes the ionization products from that chamber. As a result, exceedingly stable operation of the spark generating transducer can be attained.

Referring particularly to FIG. 4, the numeral 60 denotes a test specimen adjacent which the support 10 is disposed. Although the voltage between the conical tips of the rods 24 and 26 will usually be in excess of 10,000 volts, the total energy dissipated during each arc discharge will be quite small. As a result, the successive arc discharges which occur between the conical tips of those rods will not mar, injure, destroy or in any way adversely affect the test specimen 60 or the upper surface thereof. When the High Power Pulse Generator 40 enables the secondary winding 46 to develop high frequency arc discharges between the conical tips of the rods 24 and 26, the resulting high frequency arc discharges will automatically develop a desirably narrow beam of ultrasonic energy. If the test specimen 60 is metallic in nature, ultrasonic waves will be induced in that test specimen by the generation of opposing electromagnetic fields. If the test specimen 60 is not metallic in nature, ultrasonic waves will be generated by the tiny explosions which occur as the arc gap recurrently breaks down; and those ultrasonic waves will pass to that test specimen. Depending upon the nature and thickness of that test specimen, substantial quantities of those ultrasonic waves can pass through that test specimen.

Much of the ultrasonic energy developed within the hemispherical chamber 16 will pass directly to the upper surface of the test specimen; and most of the rest of that energy will be reflected downwardly toward the upper surface of that test specimen by that hemispherical chamber. That ultrasonic energy will cause surface waves 68 to develop at the upper surface of the test specimen 60; and those surface waves are indicated by arrows and short arcs in FIG. 4.

The numeral 62 denotes a continuous wave helium-neon laser source of standard and usual design; and that laser source is mounted above the test specimen 60, and it is oriented to direct its beam at approximately 90° to the plane of that upper surface. A beam splitter 64 is disposed intermediate the laser source 62 and the upper surface of the test specimen 60; and that beam splitter is disposed at approximately 45° to the axis of the laser beam. A photodiode detector 66 is mounted in register with the beam splitter 64, and at an angle of approximately 45° to the plane of that beam splitter. The laser source 62 directs its laser beam 70 downwardly through the beam splitter 64 to the upper surface of the test specimen 60; and then that beam reflects back up to the under surface of that beam splitter, and that beam splitter will direct the reflected laser beam 72 to the photodiode detector 66. The surface waves 68 in the upper surface of the test specimen 60 will modify the laser beam 70 in such a way that the reflected beam 72 can enable the photodiode detector 66 to develop a detectable signal which will provide desirable information regarding those surface waves.

The laser source 62 and the photodiode detector 66 are desirable because they do not engage the test specimen 60. However, any other detector which could detect the surface waves 68 without having to engage the test specimen 10 could be used. If desired, a crystal-type detector could be used, but it will be desirable to minimize the damping effect which that crystal-type detector would produce — as by providing that crystal-type detector with a face of impedance-matching material such as rubber.

It will be noted that the support 10 need not touch the test specimen 60; and hence the spark-type transducer provided by the present invention can be used with small, intricate, irregularly shaped or fragile test specimens. Also, it can be used where access to both sides of the test specimens is not practical. No liquid or paste coupling medium is needed between the support 10 and the test specimen 60; and, as a result, the spark-type transducer provided by the present invention can be used with test specimens with which liquid or paste coupling mediums can not, or should not, be used.

Referring particularly to FIG. 5, the numeral 76 denotes a detector of ultrasonic energy; and that detector can be of standard and usual form. A test specimen 74 is disposed between a support 10 of the type shown in FIGS. 1 and 2 and that detector. Ultrasonic energy, which is developed by spark discharges within the chamber 16 of the support 10, will be directed toward the test specimen 74, will pass through that test specimen, and will impinge upon the detecting portion of the detector 76. That detector will be able to sense the changes which the material or the stresses in the test specimen 74 make in the beam of ultrasonic energy; and thus will be able to provide useful information regarding the material or stresses in that particular test specimen.

Although it is desirable to use pointed-tip electrodes to define the spark gap, it would be possible to use an electrode and an adjacent conductive surface to define that arc gap. Where the test specimen is metallic, it would be possible to use that test specimen as the conductive surface adjacent which the electrode was mounted; and then the arc gap would be between that electrode and that test specimen. In each instance, the resulting ultrasonic waves are generated at a point rather than in a wide area; and hence those waves provide a desirably narrow beam of ultrasonic energy.

Various pulse generators could be used; and pulses of different lengths and configurations could be used to generate ultrasonic pulses of different frequency content. The rods 24 and 26 can be held by supports of different shapes and materials; and differing numbers of rods can be used to provide special pulse characteristics. Not only can ultrasonic waves be developed, but eddy currents can be generated in metallic test specimens. In addition, charge fields can be generated in air and in non-conductive test specimens — thereby producing voltage gradients which are useful in some testing procedures.

Whereas the drawing and accompanying description have shown and described preferred embodiments of the present invention, it should be apparent to those skilled in the art that various changes may be made in the form of the invention without affecting the scope thereof.

What I claim is:

1. A generator of energy which can be used in non-destructive testing of a test specimen and which comprises means defining a spark gap, and a source of high voltage energy which is connected to said means to develop a succession of spark discharges across said spark gap, said means being mounted relative to said test specimen so said succession of spark discharges applies a beam of energy to said test specimen which can interact with said test specimen to provide a detectable result, said means comprising a plurality of conductors which have conical tips and which are inclined relative to said test specimen to enable said tips to define an arc gap closely adjacent to said test specimen.

2. A generator of energy which can be used in non-destructive testing of a test specimen and which comprises means defining a spark gap, and a source of high voltage energy which is connected to said means to develop a succession of spark discharges across said spark gap, said means being mounted relative to said test specimen so said succession of spark discharges applies a beam of energy to said test specimen which can interact with said test specimen to provide a detectable result, said means comprising a plurality of conductors of spark-resistant material and a support of transparent dielectric material for said conductors which holds said conductors at a predetermined distance from each other, wherein said support of transparent dielectric material has a chamber of hemispherical form therein, wherein said chamber has one side thereof open and directed toward said test specimen, wherein said conductors have sharp tips which extend into said hemispherical chamber and which are spaced apart a small fraction of an inch, wherein said source of high voltage energy develops said succession of spark discharges at a high frequency rate, whereby said beam of energy is a beam of ultrasonic energy, wherein said conductors are inclined relative to said test specimen to enable said tips to define an arc gap closely adjacent to said test specimen, wherein said source of high voltage energy supplies short pulses of energy in the nanosecond range, and wherein a passage for purging gas extends through said support of dielectric material to said chamber.

* * * * *